Sept. 5, 1967  W. F. STOVER  3,339,438
TIRE REPAIRING INJECTOR TOOL
Filed Dec. 7, 1965
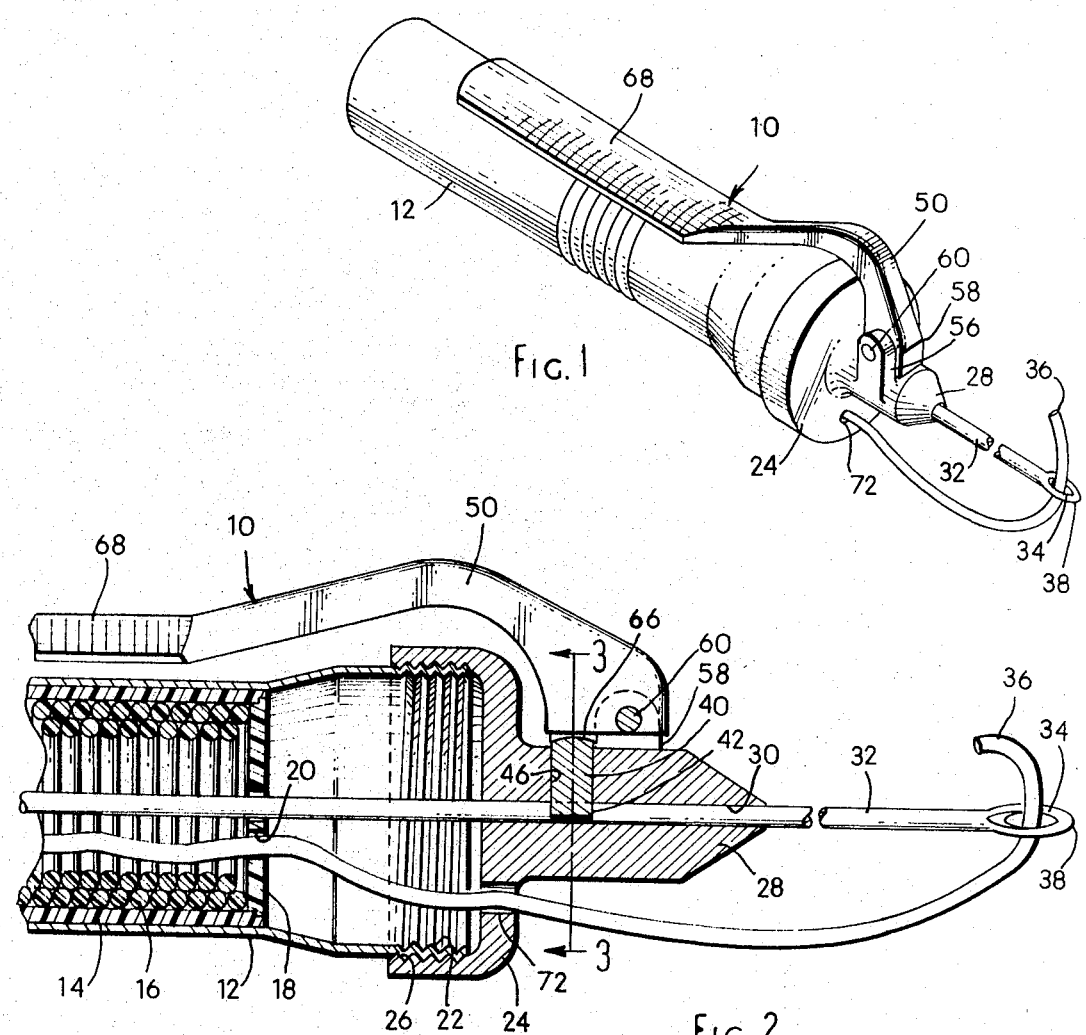
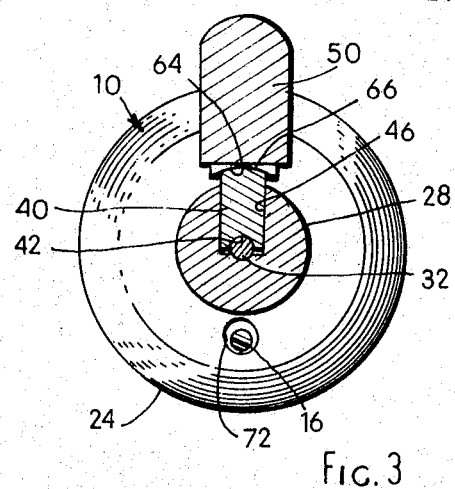
INVENTOR
WILLIAM F. STOVER
by JEFFERS & YOUNG
ATTORNEYS

United States Patent Office 3,339,438
Patented Sept. 5, 1967

3,339,438
TIRE REPAIRING INJECTOR TOOL
William F. Stover, Kittanning, Pa., assignor to Fre-Mar Industries, Inc., East Butler, Pa., a corporation of Pennsylvania
Filed Dec. 7, 1965, Ser. No. 512,177
3 Claims. (Cl. 81—15.7)

This invention relates to an injector tool and more particularly to an injector tool which is adapted for effecting repairs with a cord-like repair product which is laced into the injury of a pneumatic pressure-containing body.

The present invention finds its greatest utility in repairing tubeless tires without requiring their demounting from the wheel. An example of repair product useable with the present invention in that shown in U.S. Patent No. 3,049,164 entitled, "Puncture Repair Material."

The object of the present invention is to provide a new and improved injector tool which is capable of inserting a repair product into the injury of tubeless tires or other pneumatic pressure-containing bodies. In keeping with the object of this invention, it is intended that the tool will be comprised of a relatively few number of parts and that some of those parts can be made to serve multiple functions wherever possible, in keeping with this parts-simplification-and-reduction.

In the present invention an important feature thereof is that the head of the tool is comprised of a casting having an integral threaded end cap portion and a nose with an internal passage through which a needle is passed and clamped therein during use of the tool. The needle is used to thread the repair product into the injury and it can be pulled out whenever the need arises and then retracted. Exclusive of the cartridge or cylinder for storing the repair product the remaining essential components are only three in number: the head, which threads onto the end of the cylinder, including an integral nose; a pin for clamping a through needle which passes through the head; and a handle, or lever, for urging the pin against the needle in its operative position.

The above and other objects and features of the invention will become apparent from a consideration of the following description which proceeds with reference to the accompanying drawings, wherein:

FIGURE 1 is an isometric view of a tire repair tool having repair material threaded through the end thereof;

FIGURE 2 is an enlarged sectional detail view taken through the end of the tool, constituting a part of the injector tool; and, FIGURE 3 is a section view taken on line 3—3 of FIGURE 2.

Referring now to the drawings, an injector tool designated generally by reference numeral 10 includes a sheet metal casing 12 adapted to receive a cartridge 14 having wound therein a continuous length tire repair material designated generally by reference numeral 16. The cartridge 14 has an end closure 18 with an opening 20 through which the repair product is drawn in continuous length. The casing or housing 12 has a threaded end 22 with an end cap 24. An internal cylindrical surface 26 of the end cap 24 is threaded to join with the threaded end 22.

The end cap member 24 is an aluminum casting and has a nose or projection 28 with an internal passage 30 with a needle 32 passed therethrough and having an eyelet 34 through which is threaded the end 36 of the repair product. Needle 32 is poked into the injury of a tire to force the repair product therein and is then withdrawn, redoubling the repair material and thus completely filling and sealing the injury.

At the time needle end 38 is forced into the injury, it must be held fast, and this is accomplished by means of a pin 40 with a notch 42 which bears against and clamps the needle 32 within passage 30. The pin 40 is received in an opening 46 in the nose 28 and it bears against the needle with a force created by lever or handle 50 which is pivoted on spaced lugs 56 and 58 by means of a pivot pin 60. The recess 64 bears against a convex end 66 of the pin to urge the pin against the needle 32 as the handle 50 is forced counterclockwise about the pivot pin 60 (FIGURE 2). The counterclockwise turning is effected by gripping the knurled, configured handle portion 68 at the same time that the casing 12 is held manually. In other words, the palm or fingers concurrently grip both the handle 68 and the casing 12 which serves as a gripping means for manipulating the needle 32 and repair product.

The end cap structure is comprised of a single piece aluminum casting and provides a closure for the end of the canister 12 and provides a nose 28 through which the needle is passed and also serves to form a trunnion mounting for the lever 50.

The nose 28, together with its integral trunnion mounting and interior threaded opening 22 provides an economy of construction and is of light-weight durable construction providing the multiple functions of pivot supporting for the lever 50, a through passage 30 for the needle 32 and an end closure for the canister 12. The construction as a whole in economical to produce and is attractive in appearance and provides a ready, durable construction with an adjustable needle. The end cap member 24 includes an opening 72 through which the repair product is threaded as it is drawn out by the needle and is forced into the injury. The repair operation can continue until all of the repair product 12 is withdrawn from the canister 14, at which time the end cap member 24 is unscrewed and a new canister filled with repair product is inserted. The repair product is then threaded through openings 20 and 72 and through the eyelet 34 at the end 38 of the needle 32. At the start of tire repair operation the handle 50 is lifted and the clamping force exerted by the pin 40 on the needle is relieved and the needle 32 can be extended or retracted by pushing on the end of it, forcing the needle back through the passage 30 and into the interior of the canister 12, moving through the passage 30 and opening 20 in the end cap 18 of the canister 14.

The present invention is a specific improvement over the previously filed Patent No. 3,110,205 issued to Humphreys and Marra and entitled, "Injector Tool," in that the present invention is of simpler construction, more economical to produce, has fewer number of parts, is less prone to breakage and loss of parts in the field. Moreover, the construction is a highly attractive one in appearance and can be produced at an economical cost of manufacture.

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention, and it is intended that such revisions and adaptations will be included within the scope of the following claims as equivalents of the invention.

I claim:

1. An injector tool for inserting elongated puncture repair material in cord form into the injuries of pneumatic pressure-containing bodies, and the like, comprising: An elongated tubular portion having a hollow interior adapted to receive the repair material in coiled form therein and providing a handle for manipulation of the repair operation, means forming a threaded opening at one end of said tubular member, a unitary end cap structure threadedly received on said opening and including an opening through which the repair material is passed, passage means extending through said member, an elongated needle slideably passing through said passage and having an eyelet through which the repair material is threaded and is adapted for doubling into and out of the injury, a stem proportioned to fit within a companion opening in said member and acting against said needle to hold it within said passage during insertion of the needle and repair product into an injury, a pair of support lugs formed integrally with said member, and a clamping lever having an abutment surface and pivotally mounted on said lugs and acting against a portion of said pin protruding above said structure to produce a biasing effort which forces said pin within its companion opening to effect clamping of the needle simultaneously with gripping both said handle and said tubular portion.

2. An injector tool in accordance with claim 1 wherein said end cap structure is a unitary cast aluminum structure.

3. An injector tool in accordance with claim 1 wherein said lever includes a curved portion projecting from its pivotal mounting towards said container and adapted to lie against the cylindrical tubular portion to provide simultaneous gripping of both said tubular portion and lever to hold the needle in place while it is manipulated through the injury in the pneumatic pressure-containing body.

References Cited

UNITED STATES PATENTS 3,110,205   11/1963   Humphreys et al. ____ 81—15.7

OTHELL M. SIMPSON, *Primary Examiner.*